(12) United States Patent
Yang

(10) Patent No.: US 7,614,474 B2
(45) Date of Patent: Nov. 10, 2009

(54) ENERGY CONVERSION APPARATUS FOR WHEELED VEHICLES

(76) Inventor: Xiaoli Yang, Rm. 606, No. 22 Bldg., Jianshe Xincun, Yixing (CN) 214200

( * ) Notice: Subject to any disclaimer, the term of this patent is extended or adjusted under 35 U.S.C. 154(b) by 119 days.

(21) Appl. No.: 12/043,221

(22) Filed: Mar. 6, 2008

(65) Prior Publication Data

US 2008/0149404 A1    Jun. 26, 2008

Related U.S. Application Data

(63) Continuation of application No. PCT/CN2006/003440, filed on Dec. 18, 2006.

(51) Int. Cl.
*B60K 17/00* (2006.01)
*B60K 7/00* (2006.01)
*B60K 17/14* (2006.01)
*B60B 19/08* (2006.01)
*B60B 9/18* (2006.01)

(52) U.S. Cl. ............... 180/305; 180/65.51; 180/306; 180/307; 180/308; 152/2; 152/4; 152/15; 152/100

(58) Field of Classification Search ......... 180/65.51, 180/305, 306, 307, 308; 152/2, 4, 15, 100
See application file for complete search history.

(56) References Cited

U.S. PATENT DOCUMENTS

| | | | | |
|---|---|---|---|---|
| 1,388,061 A * | 8/1921 | Ritzel | ............ | 152/15 |
| 3,280,934 A * | 10/1966 | De Biasi | ............ | 180/308 |
| 3,396,633 A * | 8/1968 | Ryzner | ............ | 91/230 |
| 5,101,925 A * | 4/1992 | Walker | ............ | 180/243 |
| 6,698,480 B1 * | 3/2004 | Cornellier | ............ | 152/100 |
| 6,809,426 B2 * | 10/2004 | Naar et al. | ............ | 290/1 R |

* cited by examiner

*Primary Examiner*—Paul N Dickson
*Assistant Examiner*—John R Olszewski
(74) *Attorney, Agent, or Firm*—Matthias Scholl P.C.; Matthias Scholl

(57) ABSTRACT

Taught is an apparatus for converting energy in a wheeled vehicle, comprising a wheel rim; a tire; and a plurality of hydraulic plunger cylinders alternatively distributed on periphery of the wheel rim.

20 Claims, 2 Drawing Sheets

ENERGY CONVERSION APPARATUS FOR WHEELED VEHICLES

CROSS-REFERENCE TO RELATED APPLICATIONS

This application is a continuation of International Patent Application No. PCT/CN2006/003440 with an international filing date of Dec. 18, 2006, designating the United States, now pending, and further claims priority benefits to Chinese Patent Application No. 200510022653.0, filed on Dec. 24, 2005. The contents of these specifications are incorporated herein by reference.

BACKGROUND OF THE INVENTION

1. Field of the Invention

The invention relates to energy conversion in wheeled vehicles, and particularly to an apparatus for converting energy in turning wheels of a vehicle by means of hydraulic machinery.

2. Description of the Related Art

Conventional wheeled vehicles are driven by gasoline or electric engines. The higher the mass of the vehicle, the more energy is required to drive them. However, some energy inputted to drive wheeled vehicles can be recovered during vehicle movement.

For example, Chinese Pat. ZL 00257350.4 discloses a wheel power assisted device comprising a tooth ring disposed on a wheel rim and having inner teeth of more than one loop, two or more transmission gears, a center gear, a wheel rim, and a gear mounting plate. The impact force generated by the rotation of wheels is transformed into the driving force that drives the wheels to rotate, so as to assist in increasing the rotating speed of the wheels. However, the impact force generated by the rotation of the wheels is too small to be of practical use.

Chinese Pat. No. ZL9216608.X discloses a wheel power assisted device comprising a mounting plate, a plurality of pressure cylinders annularly disposed on the mounting plate, a clutch, a hydraulic fluid reservoir, a hydraulic fluid-inlet pipe, and a hydraulic fluid-outlet pipe. As the wheel rotates, the annularly disposed pressure cylinders are compressed when the wheel is contacted with the ground, and drive a power cylinder piston and transmit force to the clutch. The clutch then forces the wheel to rotate. The structure is complex and energy losses after multiple transmissions are significant. Moreover, it is difficult to attain a high-speed reciprocating movement of the pistons, and especially a simultaneous movement of two cylinders, and therefore the overall energy recovery is relatively low. Finally, the inclined position of the hydraulic fluid reservoir leads to a decreased balance during rotation of the wheel, and a large number of interconnected pipes reduces reliability.

Chinese Pat. No. ZL99205764.7 discloses a hydraulic power-assisted device comprising a hydraulic fluid reservoir, a hydraulic pump, a one-way valve, an accumulator, a switch, a safety valve, a hydraulic fluid-pipe, and a plurality of annular strengtheners. The annular strengthener disposed on a wheel rim comprises a plurality of hydraulic fluid cylinders annularly arranged at an angle to a vertical line of the wheel shaft, and an eccentric disk fixed on the wheel shaft and a hydraulic fluid-pipe. With the gravity of a vehicle and given the barrier of the eccentric disk, a piston pushes the cylinder backwardly and causes the wheel to rotate while extracting energy. However, since the device uses an external hydraulic fluid-reservoir and extra pipes are connected to an annular hydraulic strengthener, the solution is relatively complex, the number of accessories is large, the reliability is poor, and the loss of hydraulic fluid is great. Moreover, the backward push of the wheel by the cylinder not only makes the structure complex, but also does not allow for a high-speed transfer. Finally, the externally-connected hydraulic fluid pump consumes relatively high-amount of energy.

In sum, conventional annularly-arranged hydraulic cylinder devices generate hydraulic fluid pressure by compressing a hydraulic plunger during the rotation of wheels, drive hydraulic components, so as to extract energy and apply driving force to rotating wheels whenever necessary, but have the disadvantages such as complex structure, difficult applicability to multiple wheels, and high manufacturing and assembly cost. In addition, the cost requirement of externally-disposed hydraulic fluid reservoir is comparatively high, and multiple rotary seals are needed. Therefore, much opportunity for improvement remains.

SUMMARY OF THE INVENTION

One objective of the invention is to overcome the above-described disadvantages, and provide an apparatus for extracting and converting energy using hydraulic fluid at high pressure common to all wheels that features simple structure, low manufacturing cost and assembly requirement, and good interchangeability between wheels having similar specification.

In one embodiment of the invention, the energy conversion apparatus comprises a wheel rim, a tire, and a plurality of hydraulic plunger cylinders alternatively distributed on the periphery of the wheel rim.

In certain classes of this embodiment, the wheel rim comprises a plurality of peripheral annular cylinder blocks, a rotary shaft sleeve and a closed annular hydraulic fluid reservoir disposed therebetween.

In certain classes of this embodiment, the central axis of the rotary shaft sleeve operates as a wheel shaft, the rotary shaft sleeve operates as a central shaft sleeve of the wheel rim, and a central shaft circulation channel is disposed in the central axis.

In certain classes of this embodiment, the central shaft circulation channel comprises a hydraulic fluid-outlet channel and a hydraulic fluid-return channel.

In certain classes of this embodiment, a hydraulic fluid-inlet port and a hydraulic fluid-outlet port are disposed on the rotary shaft sleeve.

In certain classes of this embodiment, the hydraulic fluid-inlet port of the rotary shaft sleeve is connected to the hydraulic fluid-outlet channel of the central shaft circulation channel, and the hydraulic fluid-outlet port of the rotary shaft sleeve is connected to the hydraulic fluid-return channel of the central shaft circulation channel.

In certain classes of this embodiment, a hydraulic motor is disposed between the hydraulic fluid-outlet channel and the hydraulic fluid-return channel.

In certain classes of this embodiment, a hydraulic fluid-outlet port of each of the hydraulic plunger cylinders is connected to the hydraulic fluid-inlet port of the rotary shaft sleeve, and the hydraulic fluid-outlet port of the rotary shaft sleeve and a hydraulic fluid-inlet port of each of the hydraulic plunger cylinders are connected to the closed annular hydraulic fluid reservoir.

In certain classes of this embodiment, the relative angle between the plunger cylinders on the periphery of the wheel rim is between about 5 and 15°.

In certain classes of this embodiment, the plunger cylinders on the periphery of the wheel rim are alternatively arranged in two or multiple loops.

In certain classes of this embodiment, elastomers are disposed between the peripheral annular cylinder block and the tire.

In certain classes of this embodiment, an annular pipe is disposed at an outer edge of the closed annular hydraulic fluid reservoir, the hydraulic fluid-outlet port of each of the hydraulic plunger cylinders is connected to the annular pipe, and the annular pipe is connected to the hydraulic fluid-inlet port of the rotary shaft sleeve via a diversion tube.

In certain classes of this embodiment, the annular pipe is a ring groove disposed on the peripheral annular cylinder block.

In certain classes of this embodiment, the high pressure output hydraulic fluid from all wheels of a vehicle is combined and guided to the hydraulic motor.

In other aspects, the invention provides a process for extracting and converting energy from a moving wheeled vehicle comprising compressing under the force of gravity a plurality of reciprocating plungers and decompressing the plurality of reciprocating plungers as the wheel rotates through a certain angle.

In certain classes of this embodiment, the wheel contacted with the ground is compressed (volume compression) and outputs a substantially uncompressible hydraulic fluid, such as a hydraulic fluid, which is transferred to an outer rotary sleeve of the central axis via the one-way valve of the plunger cylinder, returned to the central axis after being worked by the hydraulic fluid-outlet hole of the central axis and a connected hydraulic motor via rotary connection and transmitted to the outer rotary sleeve via a rotary connection, and enters the annular hydraulic fluid reservoir.

In certain classes of this embodiment, the hydraulic cylinder plunger recovers under the action of the reset spring, the one-way valve of the hydraulic fluid-inlet port of the hydraulic cylinder is opened (the hydraulic fluid-outlet port is closed), the hydraulic fluid is absorbed from the annular hydraulic fluid reservoir on the connected wheel, and the hydraulic fluid emission-absorption process of the hydraulic cylinder is completed.

During operation, the hydraulic fluid forms a closed circle within the following: the hydraulic cylinder plunger, the hydraulic fluid-inlet port of the central rotary shaft sleeve, the hydraulic fluid-outlet channel of the central axis, the connected hydraulic motor, the hydraulic fluid-return channel of the central axis, the hydraulic fluid-outlet port of the central rotary shaft sleeve, the annular hydraulic fluid reservoir, and the hydraulic cylinder plunger. As long as the wheel continuously rotates, hydraulic cylinder plungers on the periphery of the wheel rim operate, each in its own turn, and uninterruptedly output hydraulic fluid at high pressure to drive the externally-connected hydraulic motor.

Advantages provided by the invention are as follows. The invention is capable of making use of the weight of a vehicle to extract and convert energy. Compared with the prior art, the embodiments of the invention have a simple structure and low manufacturing and assembling requirement, may be used directly as a wheel, do not require the traditional inflatable inner tube, combine and provide output hydraulic fluid at high pressure from all wheels to the hydraulic motor, and features good interchangeability between wheels having similar specification.

Taking a gas-powered vehicle as an example, by utilizing the output hydraulic fluid at high pressure to drive a hydraulic motor, fuel savings of 45-60% may be realized. The hydraulic fluid circulates in the wheel and no complex rotary seal is needed, which greatly improve operating reliability and allow for application of the invention to high-speed wheels. Specifically, embodiments of the invention are applicable to vehicles such as cars, trucks, bicycles, and so on. The energy saving rate is proportional to speed.

Legend: 1. Elastomer; 2. Axial expanding and positioning sleeve; 3. Reset spring; 4. Reciprocating plunger; 5. Annular plunge cylinder; 6. Annular pipe; 7. One-way valve; 8. One-way valve; 9. Diversion tube; 10. Web plate; 11. Rotary shaft sleeve; 12. Bearing; 13-1. Hydraulic fluid-outlet channel; 13-2. Hydraulic fluid-return channel; 14. Central axis; 15. Concave circular groove; 16. Connecting pipe; 17. Hydraulic motor; 18. Seal; 19. Axle surface ring groove; 20. Hydraulic fluid-outlet port; 21. Hydraulic fluid-inlet port; 22. Hydraulic fluid reservoir; 23. Rubber tire; 24. Plunger cylinder

DETAILED DESCRIPTION OF THE INVENTION

The accompanying drawings disclose an embodiment of the invention, which should not be interpreted as a particular limitation to the structure of the invention, and further description will be given below in conjunction with the accompanying drawings.

A central shaft circulation channel is disposed in a central axis 14, and a fluid circulation channel is disposed between a rotary shaft sleeve 11 and the central axis 14.

EXAMPLE 1

Figure 1:
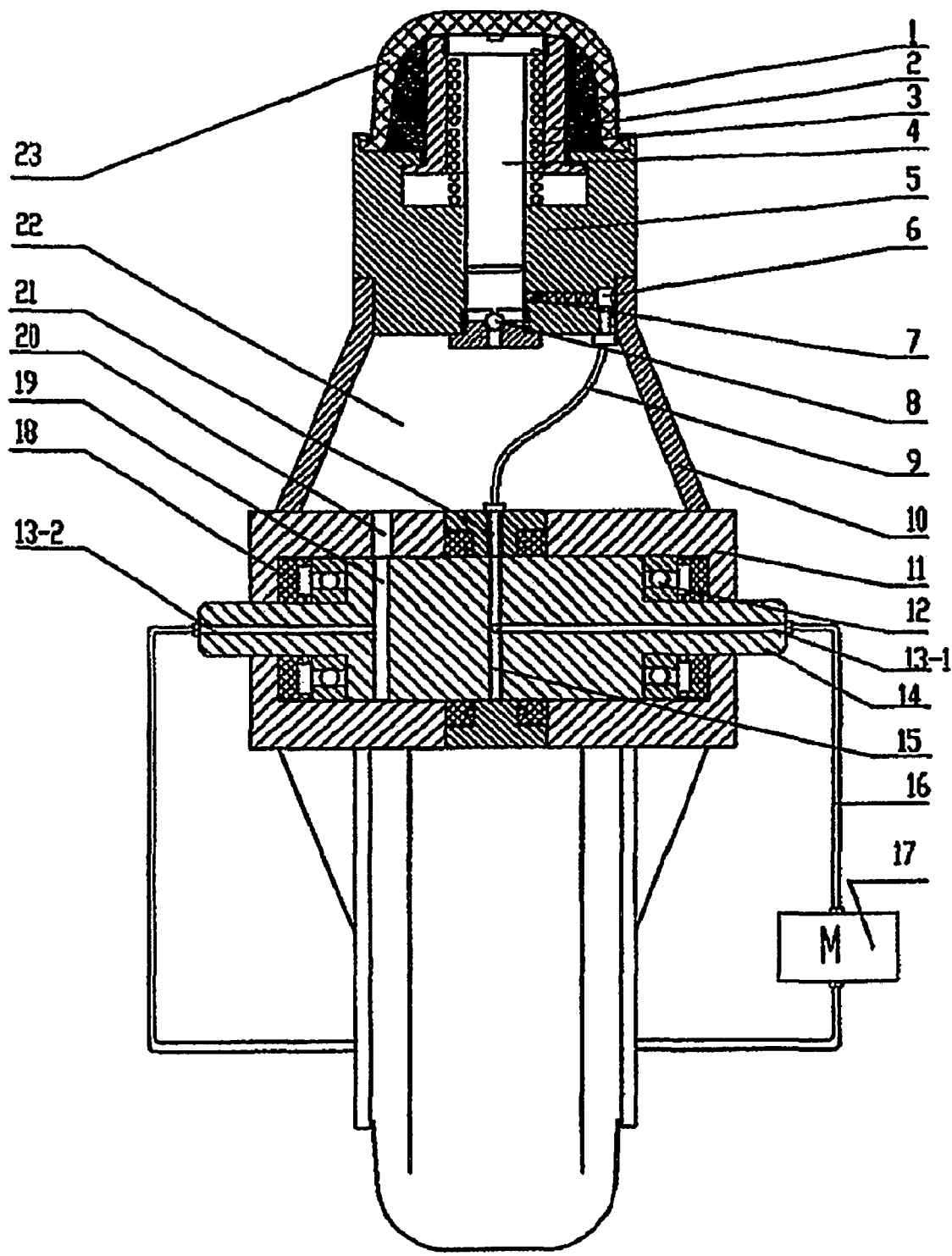
FIG. 1 shows a schematic diagram of an energy conversion apparatus according to one embodiment of the invention.
Figure 2:
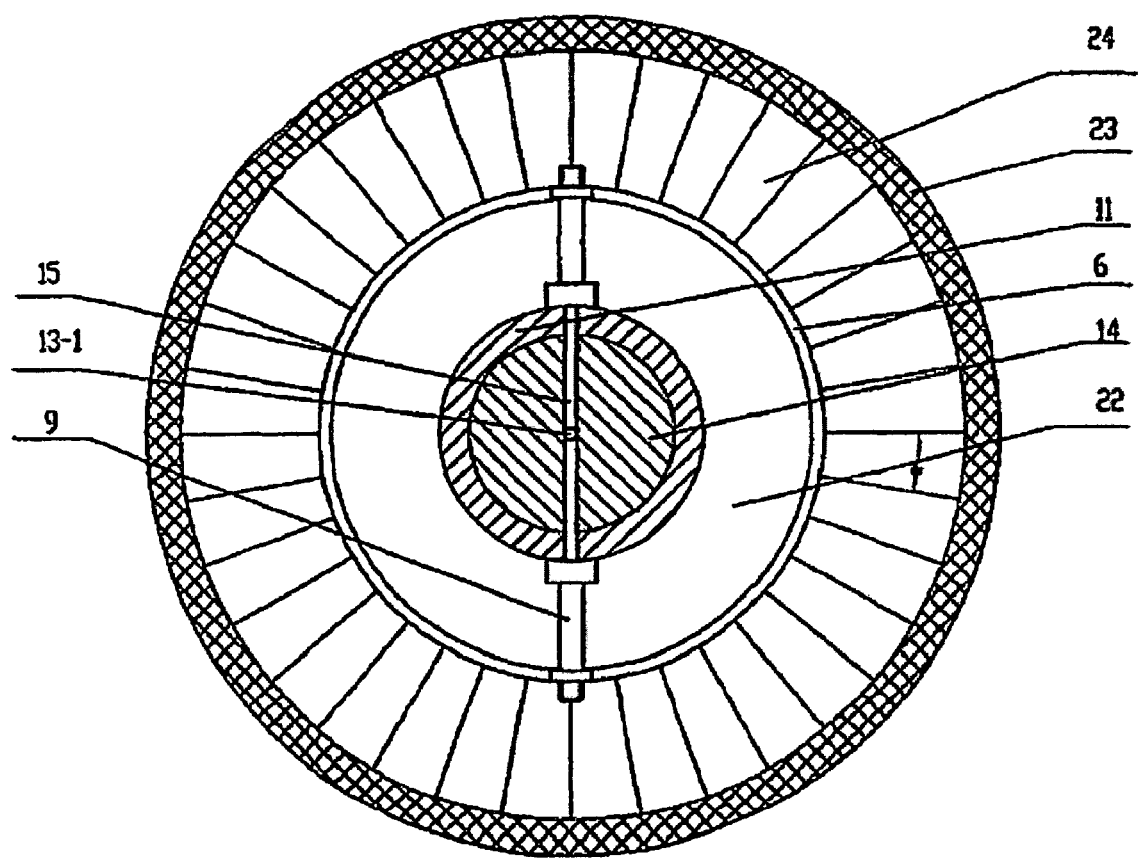
FIG. 2 is a right side view of the embodiment shown in FIG. 1.

Referring to FIGS. 1 and 2, in an energy conversion apparatus for wheeled vehicles, a wheel rim comprises a plurality of peripheral annular cylinder blocks 5, a rotary shaft sleeve is disposed on the center comprising a rotary shaft sleeve 11 and a central axis 14, and a closed annular hydraulic fluid reservoir 22 is disposed therebetween and surrounded by a pair of web plates 10. A central shaft circulation channel is disposed on the central axis 14, and comprises a hydraulic fluid-outlet channel 13-1 and a hydraulic fluid-return channel 13-2 of the central axis 14. A hydraulic fluid-inlet port 21 and a hydraulic fluid-outlet port 22 are disposed on the rotary shaft sleeve 11. A concave ring groove 15 corresponding to the hydraulic fluid-inlet port of the rotary shaft sleeve and a concave ring groove 19 corresponding to the hydraulic fluid-outlet port of the rotary shaft sleeve are disposed on the surface of the central axis 14, and are connected to the hydraulic fluid-outlet channel 13-1 and the hydraulic fluid-return channel 13-2 of the central axis 14, respectively, so as to form a rotary and connected fluid circulation channel between the rotary shaft sleeve 11 and the central axis 14.

A bearing 12 and a seal 18 are respectively disposed between both sides of the central axis 14 and the rotary shaft sleeve 11. The hydraulic fluid-outlet channel 13-1 and the hydraulic fluid-return channel 13-2 of the central axis 14 are connected to a hydraulic motor 17 via a connecting pipe 16 (output hydraulic fluid at high pressure from all the wheels of a vehicle may be combined and provided to the hydraulic motor), so as to enable hydraulic fluid to form a circulation loop.

An elastromer 1 is filled and a rubber tire 23 is disposed outside the peripheral annular cylinder block 5 of the wheel rim. A plurality of plunger holes are disposed on the peripheral annular cylinder block 5 in an angle of about 10°. A reciprocating plunger 4 extending to an inner wall of the tire is disposed in the peripheral annular cylinder block 5. A plunger reset spring 3 and an axial expanding and positioning sleeve 2 are disposed at axial periphery of the peripheral annular cylinder block 5 and outside of the reciprocating plunger 4. An annular pipe 6 composed of ring grooves is disposed on the peripheral annular cylinder block 5 at the outer edge of an annular hydraulic fluid reservoir 22, and is connected to the hydraulic fluid-inlet port 21 of the rotary shaft sleeve 11 via a diversion tube 9. The hydraulic fluid-outlet port 20 of the rotary shaft sleeve 11 extends into the annular hydraulic fluid reservoir 22. A one-way valve 7 is disposed on the hydraulic fluid-outlet port of each of the annularly-disposed plunger cylinders 24 and connected to the annular pipe 6. A one-way valve 8 is disposed on the hydraulic fluid-inlet port of each of the annularly-disposed plunger cylinders 24 and connected to the annular hydraulic fluid reservoir 22.

As the wheel rotates, the reciprocating plunger 4 in the plunger cylinder 24 is compressed and moves axially, hydraulic fluid in the plunger hole is emitted to the annular pipe 6 via the one-way valve 7 (at this time the one-way valve 8 is turned off). Incremental hydraulic fluid at high pressure flows through the diversion tube 9, the hydraulic fluid-inlet port 21 of the rotary shaft sleeve 11, the concave ring groove 15, the hydraulic fluid-outlet channel 13-1 of the central axis and the connecting pipe 16, and powers the hydraulic motor 17 to generate rotary force. After the hydraulic motor 17 generates power, discharging hydraulic fluid is emitted to the annular hydraulic fluid reservoir 22 via the hydraulic fluid-return channel 13-2, the axle surface ring groove 19, and the hydraulic fluid-outlet port 20 of the rotary shaft sleeve 11. As the wheel rotates through a certain angle, the reciprocating plunger 4 in the plunger cylinder 24 rotates off the ground and moves backwardly under the action of the reset spring 3, the one-way valve 8 is turned on (the one-way valve 7 is turned off) and absorbs the hydraulic fluid from the annular hydraulic fluid reservoir 22 to fill the hydraulic cylinder. As the wheel rotates continuously, plunge cylinders operate alternatively and output hydraulic fluid at high pressure to an externally-connected hydraulic motor, so as to enable the hydraulic motor to continuously rotate and to generate power.

The following additional embodiments and variations from the main embodiment described-above may be utilized:

The hydraulic fluid-outlet channel 13-1 and the hydraulic fluid-return channel 13-2 of the central shaft circulation channel may be disposed at both ends of the central axis 14 or the same end of the central axis 14, as long as the two channels themselves are not connected.

The plunger cylinders 24 may be alternatively arranged on the periphery of the wheel rim, and a density of each of the plunger cylinders 24 may be determined according to a diameter of a wheel and stability requirement during rotation of the wheel. Preferably, the relative angle between two plunger cylinders is between 5 and 15°. The closer the plunger cylinders are arranged, the more stable and continuous flow of the output hydraulic fluid at high pressure will be obtained.

Depending on the width of the wheel, the plunger cylinders 24 may be alternatively arranged in one, two, or more loops, so as to increase the number of hydraulic cylinders on the periphery of the wheel rim, and to increase the output of the hydraulic fluid at high pressure.

To simplify the design of transmission pipes of the hydraulic fluid and reduce weight, a closed annular pipe is disposed on the wheel rim, so that hydraulic fluid from all the plunger cylinders 24 is combined into the closed annular pipe and only a small number (one or two) pipes are required to connect the closed annular pipe to the hydraulic fluid-inlet port 21 of the rotary shaft sleeve 11. Consequently, no connecting pipes for connecting the hydraulic fluid-outlet ports of each of the plunger cylinders 24 to the hydraulic fluid-inlet port 21 of the rotary shaft sleeve 11 are needed.

Moreover, in certain embodiments of the invention, by installing a switching valve, the output hydraulic fluid at high pressure flows back into the annular hydraulic fluid reservoir 22 as the wheel rotates in reverse.

What is claimed is:

1. An apparatus for converting energy in a wheeled vehicle comprising:
   a wheel rim;
   a tire; and
   a plurality of hydraulic plunger cylinders alternatively distributed on periphery of the wheel rim;
wherein,
   the wheel rim comprises a plurality of peripheral annular cylinder blocks, a rotary shaft sleeve, and a closed annular hydraulic fluid reservoir disposed therebetween;
   a central axis of the rotary shaft sleeve operates as a wheel shaft,
   the rotary shaft sleeve operates as a central shaft sleeve of the wheel rim,
   a central shaft circulation channel is disposed on the central axis;
   the central shaft circulation channel comprises a hydraulic fluid-outlet channel and a hydraulic fluid-return channel,
   a hydraulic fluid-inlet port and a hydraulic fluid-outlet port are disposed on the rotary shaft sleeve,
   the hydraulic fluid-inlet port of the rotary shaft sleeve is connected to the hydraulic fluid-outlet channel of the central shaft circulation channel,
   the hydraulic fluid-outlet port of the rotary shaft sleeve is connected to the hydraulic fluid-return channel of the central shaft circulation channel;
   a hydraulic motor is disposed between the hydraulic fluid-outlet channel and the hydraulic fluid-return channel;
   a hydraulic fluid-outlet port of each of the hydraulic plunger cylinders is connected to the hydraulic fluid-inlet port of the rotary shaft sleeve, and
   the hydraulic fluid-outlet port of the rotary shaft sleeve and the hydraulic fluid-inlet port of each of the hydraulic plunger cylinders are connected to the closed annular hydraulic fluid reservoir.

2. The apparatus of claim 1, wherein the relative angle between the plunger cylinders on the periphery of the wheel rim is between 5 and 15°.

3. The apparatus of claim 2, wherein the plunger cylinders on the periphery of the wheel rim are alternatively arranged in two or multiple loops.

4. The apparatus of claim 1, wherein elastomer is filled between the peripheral annular cylinder block and the tire.

5. The apparatus of claim 1, wherein
   an annular pipe is disposed at an outer edge of the closed annular hydraulic fluid reservoir;
   the hydraulic fluid-outlet port of each of the hydraulic plunger cylinders is connected to the annular pipe; and
   the annular pipe is connected to the hydraulic fluid-inlet port of the rotary shaft sleeve via a diversion tube.

6. The apparatus of claim 2, wherein
an annular pipe is disposed at an outer edge of the closed annular hydraulic fluid reservoir;
the hydraulic fluid-outlet port of each of the hydraulic plunger cylinders is connected to the annular pipe; and
the annular pipe is connected to the hydraulic fluid-inlet port of the rotary shaft sleeve via a diversion tube.

7. The apparatus of claim 3, wherein
an annular pipe is disposed at an outer edge of the closed annular hydraulic fluid reservoir;
the hydraulic fluid-outlet port of each of the hydraulic plunger cylinders is connected to the annular pipe; and
the annular pipe is connected to the hydraulic fluid-inlet port of the rotary shaft sleeve via a diversion tube.

8. The apparatus of claim 4, wherein
an annular pipe is disposed at an outer edge of the closed annular hydraulic fluid reservoir;
the hydraulic fluid-outlet port of each of the hydraulic plunger cylinders is connected to the annular pipe; and
the annular pipe is connected to the hydraulic fluid-inlet port of the rotary shaft sleeve via a diversion tube.

9. The apparatus of claim 5, wherein the annular pipe is a ring groove disposed on the peripheral annular cylinder block.

10. The apparatus of claim 6, wherein the annular pipe is a ring groove disposed on the peripheral annular cylinder block.

11. The apparatus of claim 7, wherein the annular pipe is a ring groove disposed on the peripheral annular cylinder block.

12. The apparatus of claim 8, wherein the annular pipe is a ring groove disposed on the peripheral annular cylinder block.

13. The apparatus of claim 1, wherein output hydraulic fluid at high pressure from all wheels of a vehicle is combined and provided to the hydraulic motor.

14. The apparatus of claim 2, wherein output hydraulic fluid at high pressure of all wheels of a vehicle is combined and provided to the hydraulic motor.

15. The apparatus of claim 3, wherein output hydraulic fluid at high pressure of all wheels of a vehicle is combined and provided to the hydraulic motor.

16. The apparatus of claim 4, wherein output hydraulic fluid at high pressure of all wheels of a vehicle is combined and provided to the hydraulic motor.

17. The apparatus of claim 9, wherein output hydraulic fluid at high pressure of all wheels of a vehicle is combined and provided to the hydraulic motor.

18. The apparatus of claim 10, wherein output hydraulic fluid at high pressure of all wheels of a vehicle is combined and provided to the hydraulic motor.

19. The apparatus of claim 11, wherein output hydraulic fluid at high pressure of all wheels of a vehicle is combined and provided to the hydraulic motor.

20. The apparatus of claim 12, wherein output hydraulic fluid at high pressure of all wheels of a vehicle is combined and provided to the hydraulic motor.

* * * * *